(12) United States Patent
Jeong et al.

(10) Patent No.: US 12,353,993 B2
(45) Date of Patent: Jul. 8, 2025

(54) DOMAIN ADAPTATION FOR ROBOTIC CONTROL USING SELF-SUPERVISED LEARNING

(71) Applicant: DeepMind Technologies Limited, London (GB)

(72) Inventors: Rae Chan Jeong, London (GB); Yusuf Aytar, London (GB); David Khosid, London (GB); Yuxiang Zhou, London (GB); Jacqueline Ok-chan Kay, London (GB); Thomas Lampe, London (GB); Konstantinos Bousmalis, London (GB); Francesco Nori, London (GB)

(73) Assignee: DeepMind Technologies Limited, London (GB)

( * ) Notice: Subject to any disclaimer, the term of this patent is extended or adjusted under 35 U.S.C. 154(b) by 1254 days.

(21) Appl. No.: 17/065,489

(22) Filed: Oct. 7, 2020

(65) Prior Publication Data

US 2021/0103815 A1    Apr. 8, 2021

(30) Foreign Application Priority Data

Oct. 7, 2019 (GR) .............................. 20190100441

(51) Int. Cl.
*G06N 3/08* (2023.01)
*G05B 19/4155* (2006.01)

(52) U.S. Cl.
CPC ............ *G06N 3/08* (2013.01); *G05B 19/4155* (2013.01); *G05B 2219/41054* (2013.01); *G05B 2219/50391* (2013.01)

(58) Field of Classification Search
CPC .................. G06N 3/08; G05B 19/4155; G05B 2219/41054; G05B 2219/50391; G05B 2219/40499
See application file for complete search history.

(56) References Cited

U.S. PATENT DOCUMENTS 1,153,713 A * 9/1915 Sayers .................... B42F 13/12
402/59
10,926,408 B1 * 2/2021 Vogelsong ............... B25J 9/163
(Continued)

OTHER PUBLICATIONS

Sermanet P, Lynch C, Chebotar Y, Hsu J, Jang E, Schaal S, Levine S, Brain G. Time-contrastive networks: Self-supervised learning from video. In2018 IEEE international conference on robotics and automation (ICRA) May 21, 2018 (pp. 1134-1141). IEEE. (Year: 2018).*

(Continued)

*Primary Examiner* — Oluwatosin Alabi

(74) *Attorney, Agent, or Firm* — Fish & Richardson P.C.

(57) ABSTRACT

Methods, systems, and apparatus, including computer programs encoded on computer storage media, for training a policy neural network for use in controlling a real-world agent in a real-world environment. One of the methods includes training the policy neural network by optimizing a first task-specific objective that measures a performance of the policy neural network in controlling a simulated version of the real-world agent; and then training the policy neural network by jointly optimizing (i) a self-supervised objective that measures at least a performance of internal representations generated by the policy neural network on a self-supervised task performed on real-world data and (ii) a second task-specific objective that measures the performance of the policy neural network in controlling the simulated version of the real-world agent.

21 Claims, 3 Drawing Sheets

(56) References Cited

U.S. PATENT DOCUMENTS

| | | | |
|---|---|---|---|
| 11,256,983 B2* | 2/2022 | Ogale | G06N 3/084 |
| 11,479,243 B2* | 10/2022 | Cui | B60W 30/0953 |
| 11,833,681 B2* | 12/2023 | Iqbal | B25J 9/163 |
| 2015/0100530 A1* | 4/2015 | Mnih | G06N 3/08 |
| | | | 706/25 |

OTHER PUBLICATIONS

Aytar, Yusuf, Tobias Pfaff, David Budden, Thomas Paine, Ziyu Wang, and Nando De Freitas. "Playing hard exploration games by watching youtube." Advances in neural information processing systems 31 (2018). (Year: 2018).*

Tai, L., Zhang, J., Liu, M., Boedecker, J. and Burgard, W., A survey of deep network solutions for learning control in robotics: From reinforcement to imitation. arXiv 2016. arXiv preprint arXiv:1612.07139. (Year: 2016).*

Ebert, F., Finn, C., Dasari, S., Xie, A., Lee, A. and Levine, S., 2018. Visual foresight: Model-based deep reinforcement learning for vision-based robotic control. arXiv preprint arXiv:1812.00568. (Year: 2018).*

Liu, Y., Gupta, A., Abbeel, P. and Levine, S., 2018, May. Imitation from observation: Learning to imitate behaviors from raw video via context translation. In 2018 IEEE international conference on robotics and automation (ICRA) (pp. 1118-1125). IEEE. (Year: 2018).*

Ghadirzadeh, A., Maki, A., Kragic, D., & Björkman, M. (Sep. 2017). Deep predictive policy training using reinforcement learning. In 2017 IEEE/RSJ International Conference on Intelligent Robots and Systems (IROS) (pp. 2351-2358). IEEE. (Year: 2017).*

Arulkumaran K, Deisenroth MP, Brundage M, Bharath AA. A brief survey of deep reinforcement learning. arXiv preprint arXiv:1708.05866. Aug. 19, 2017. (Year: 2017).*

Van Baar J, Sullivan A, Cordorel R, Jha D, Romeres D, Nikovski D. Sim-to-real transfer learning using robustified controllers in robotic tasks involving complex dynamics. In2019 International Conference on Robotics and Automation (ICRA) May 20, 2019 (pp. 6001-6007). IEEE. (Year: 2019).*

Pathak D, Gandhi D, Gupta A. Self-supervised exploration via disagreement. InInternational conference on machine learning May 24, 2019 (pp. 5062-5071). PMLR. (Year: 2019).*

Abdolmaleki et al., "Maximum a posteriori policy optimization," CoRR, Jun. 2018, arxiv.org/abs/1806.06920, 23 pages.

Andrychowicz et al., "Learning dexterous in-hand manipulation," CoRR, Aug. 2018, arxiv.org/abs/1808.00177, 27 pages.

Aytar et al., "Playing hard exploration games by watching youtube," CoRR, May 2018, arxiv.org/abs/1805.11592, 15 pages.

Bousmalis et al., "Domain separation networks," CoRR, Aug. 2016, arxiv.org/abs/1608.06019, 15 pages.

Bousmalis et al., "Unsupervised pixel level domain adaptation with generative adversarial networks," Proceedings of the IEEE Conference on Computer Vision and Pattern Recognition, 2017, pp. 3722-3731.

Bousmalis et al., "Using simulation and domain adaptation to improve efficiency of deep robotic grasping," CoRR, Sep. 2017, abs/1709.07857, 9 pages.

Caseiro et al., "Beyond the shortest path: Unsupervised Domain Adaptation by Sampling Subspaces Along the Spline Flow," Proceedings of the IEEE Conference on Computer Vision and Pattern Recognition, 2015, pp. 3846-3854.

Chebotar et al., "Closing the sim-to-real loop: Adapting simulation randomization with real world experience," 2019 International Conference on Robotics and Automation, May 2019, 10 pages.

Chopra et al., "Learning a similarity metric discriminatively, with application to face verification," 2005 IEEE Computer Society Conference on Computer Vision and Pattern Recognition, Jun. 2005, 8 pages.

Csurka, "Domain adaptation for visual applications: A comprehensive survey," CoRR, Feb. 2017, arxiv.org/abs/1702.05374, 46 pages.

Fernando et al., "Self-supervised video representation learning with odd-one-out networks," Proceedings of the IEEE Conference on Computer Vision and Pattern Recognition, 2017, pp. 3636-3645.

Ganin et al., "Domain-adversarial training of neural networks," The Journal of Machine Learning Research, Apr. 2016, 17(1):2096-2030.

Gregor et al., "Shaping belief states with generative environment models for rl," CoRR, Jun. 2019, arXiv:1906.09237, 22 pages.

Guo et al., "Neural predictive belief representations," CoRR, Nov. 2018, arxiv.org/abs/1811.06407, 15 pages.

Hadsell et al., "Dimensionality reduction by learning an invariant mapping," 2006 IEEE Computer Society Conference on Computer Vision and Pattern Recognition, Jun. 2006, 2:1735-1742.

Kalashnikov et al., "Qt-opt: Scalable deep reinforcement learning for vision-based robotic manipulation," CoRR, Jun. 2018, arxiv.org/abs/1806.10293, 23 pages.

Kolev et al., "Physically consistent state estimation and system identification for contacts," 2015 IEEE-RAS 15th International Conference on Humanoid Robots (Humanoids), Nov. 2015, manoids), pp. 1036-1043.

Levine et al., "Learning hand-eye coordination for robotic grasping with deep learning and large-scale data collection," CoRR, Mar. 2016, arxiv.org/abs/1603.02199, 12 pages.

Matas et al., "Sim-to-real reinforcement learning for deformable object manipulation," CoRR, Jun. 2018, arxiv.org/abs/1806.07851, 10 pages.

Misra et al., "Shuffle and learn: unsupervised learning using temporal order verification," European Conference on Computer Vision, Sep. 2016, pp. 527-544.

Nair et al., "Overcoming exploration in reinforcement learning with demonstrations," CoRR, Sep. 2017, arxiv.org/abs/1709.10089, 8 pages.

Oord et al., "Representation learning with contrastive predictive coding," CoRR, Jul. 2018, arxiv.org/abs/1807.03748, 13 pages.

Peng et al., "Sim-to-real transfer of robotic control with dynamics randomization," CoRR, Oct. 2017, arxiv.org/abs/1710.06537, 8 pages.

Pinto et al., "Asymmetric actor critic for image-based robot learning," CoRR, Oct. 2017, arxiv.org/abs/1710.06542, 8 pages.

Schwab et al., "Simultaneously learning vision and feature based control policies for real-world ball-in-a-cup," CoRR, Feb. 2019, arxiv.org/abs/1902.04706, 12 pages.

Sermanet et al., "Time-Contrastive Networks: Self-Supervised Learning from Video," 2018 IEEE International Conference on Robotics and Automation, May 2018, 15 pages.

Sohn, "Improved deep metric learning with multi-class n-pair loss objective," Proceedings of the 30th International Conference on Neural Information Processing Systems, Dec. 2016, pp. 1857-1865.

Tobin et al. "Domain randomization for transferring deep neural networks from simulation to the real world," CORR, Mar. 2017, arxiv.org/abs/1703.06907, 8 pages.

Todorov et al., "Mujoco: A physics engine for model-based control," 2012 IEEE/RSJ International Conference on Intelligent Robots and Systems, Oct. 2012, pp. 5026-5033.

Van der Maaten et al., "Visualizing data using t-SNE," Journal of Machine Learning Research, Nov. 2008, 9(11):2579-2605.

Vecerik et al., "Leveraging demonstrations for deep reinforcement learning on robotics problems with sparse rewards," CoRR, Jul. 2017, arxiv.org/abs/1707.08817, 10 pages.

Wei et al., "Learning and using the arrow of time," Proceedings of the IEEE Conference on Computer Vision and Pattern Recognition, 2018, pp. 8052-8060.

Zhu et al., "Reinforcement and imitation learning for diverse visuomotor skills," CoRR, Feb. 2018, arxiv.org/abs/1802.09564, 12 pages.

Pathak et al., "Curiosity-driven Exploration by Self-supervised Prediction," Proceedings of the 34th International Conference on Machine Learning, 2017, 70:2778-2787.

\* cited by examiner

DOMAIN ADAPTATION FOR ROBOTIC CONTROL USING SELF-SUPERVISED LEARNING

CROSS-REFERENCE TO RELATED APPLICATION

This application is based upon and claims the benefit of priority of the prior Greek Patent Application No. 20190100441, filed Oct. 7, 2019, the entire contents of which is incorporated by reference in the disclosure of this application.

BACKGROUND

This specification relates to controlling robotic agents.

In some cases, a robotic agent interacts with an environment by performing actions that are selected by a system in response to receiving observations that characterize the current state of the environment.

Some systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system that trains a policy neural network to control a real-world agent interacting with a real-world environment to cause the real-world agent to perform a particular task.

Particular embodiments of the subject matter described in this specification can be implemented so as to realize one or more of the following advantages.

The described systems train a policy neural network on labeled simulated data combined with a relatively small amount of unlabeled real-world data and without requiring any labeled real-world data. This is advantageous because images of the real-world can be difficult to obtain while simulated images can be generated easily.

In general, large amounts of simulated training data with accurate labels for robotic control can be generated relatively easily because the simulated training data is generated using a computer program simulation of a real-world environment. Real-world training data for robotic control, i.e., data gathered through actual interaction of the robotic agent with the real-world environment, on the other hand, is time-intensive and resource-intensive to collect, results in mechanical wear on the robotic agent, and can have noisy labels.

However, simulated training data is in practice difficult to employ in effectively training the policy neural network for use in controlling a real-world robotic agent interacting with the real-world environment. That is, directly using the simulation training data for training the control policy without accounting for the fact that the simulation training data is drawn from a different domain (simulation) than the intended domain (real-world) will generally result in the trained control policy performing poorly at controlling the real-world robot.

Some of the reasons for this poor performance can include that a specific simulation may not generalize well to an entire real-world environment and that the simulated data is systematically different from counterpart real-world data, e.g., because the real-world environment is less structured and predictable than the simulated environment, because images of the real-world environment appear differently from images of the simulated environment, and because dynamics of the real-world robotic agent can differ somewhat from the simulated version of the agent.

By training the policy neural network as described in this specification, the policy neural network can be effectively trained in simulation and then later adapted for controlling the real-world agent with only a small amount of unlabeled real-world data. Being able to train the policy neural network in simulation greatly increases the amount of high-quality training data available for training the policy neural network. This results in improved performance of the trained network and of the robotic agent in performing the robotic task.

By fine-tuning the policy neural network through training on the self-supervised objective and the second task-specific objective, the need to generate large labeled datasets of real-world environment interactions is eliminated. Therefore, mechanical wear on the robotic agent during learning of the control policy is reduced. In particular, the self-supervised objective ensures that the policy neural network can generalize to the real-world environment while the joint training with the second task-specific objective ensures that this does not adversely impact the performance of the agent on the particular task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
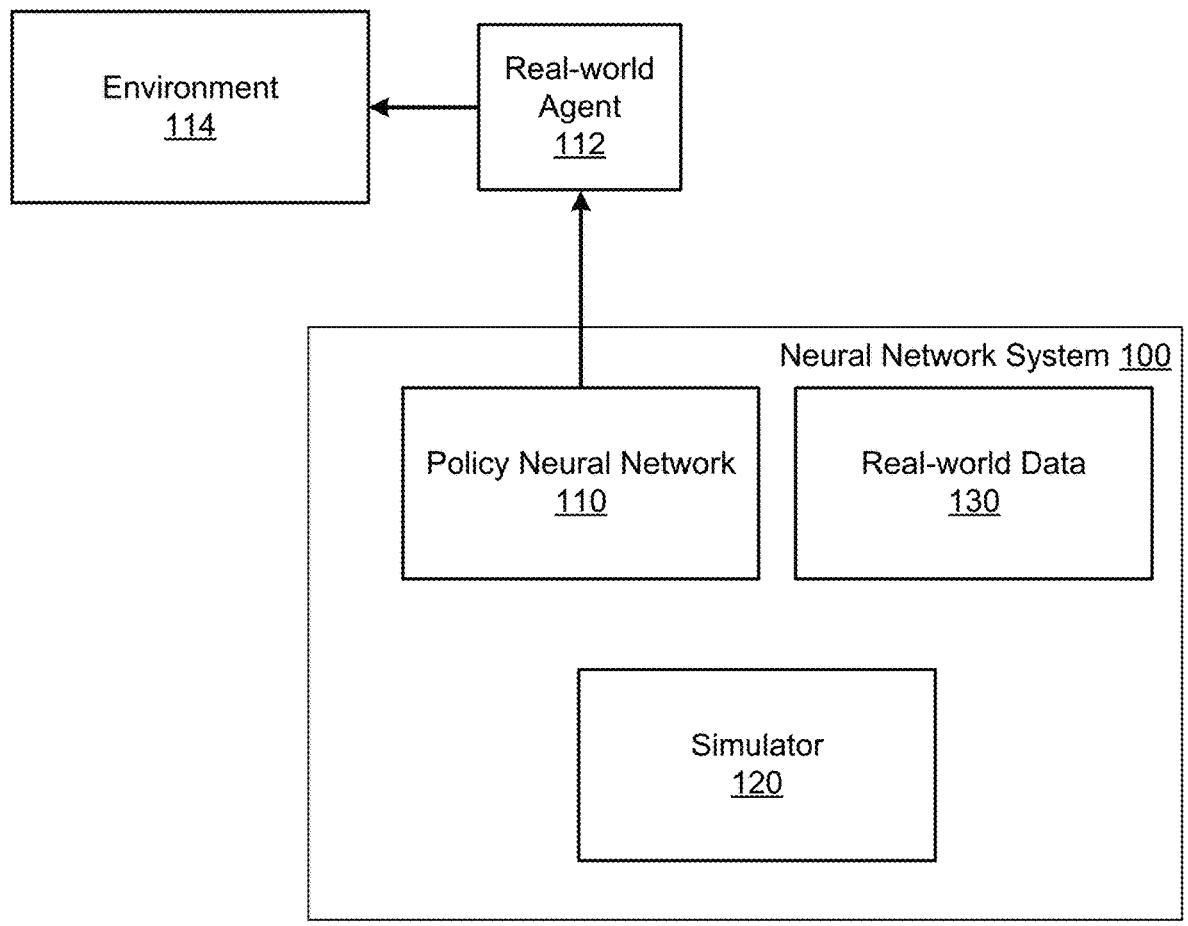
FIG. 1 shows an example neural network training system.

FIG. 1 shows an example neural network training system 100. The system 100 is an example of a system implemented as computer programs on one or more computers in one or more locations, in which the systems, components, and techniques described below can be implemented.

The system 100 trains a policy neural network 110 to control a real-world agent 112 interacting with a real-world environment 114 to cause the real-world agent 112 to perform a sequence of actions to perform a particular task.

The real-world agent 112 is generally a robotic agent, e.g., a robotic arm or another, more complex robot that is controllable to change position within the environment. Examples of more complex robots include humanoid robots and autonomous vehicles, e.g., land vehicles or aircraft.

The policy neural network 110 is configured to receive an observation that characterizes the state of the environment and to generate a policy output that defines an action to be performed by the agent in response to the observation. The observation generally includes a visual observation, e.g., one or more images of the environment, e.g., captured by a camera sensor of the agent, captured by another camera located in the environment, or both. The observation can optionally also include other information, e.g., proprioceptive features, data identifying the most recent action performed by the agent and the most recently received reward, and so on.

The actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment.

In some cases, the policy output defines a probability distribution over possible actions to be performed by the agent 112. For example, the policy output can include a respective action probability for each action in a set of possible actions that can be performed by the agent 112 to interact with the environment 114. In another example, in order to allow for fine-grained control of the agent, the system 100 can treat the space of actions to be performed by the agent, i.e., the set of possible control inputs, as a continuous space. In these cases, the output of the policy neural network 110 can be the parameters of a multi-variate probability distribution over the space, e.g., the means and covariances of a multi-variate Normal distribution.

In some other cases, the policy output includes a respective Q value for each of a plurality of possible actions. A Q value for a possible action represents an expected return to be received if the agent performs the possible action in response to the observation.

A return refers to a cumulative measure of rewards received by the agent 112, for example, a time-discounted sum of rewards. Generally, a reward is a scalar numerical value and characterizes, e.g., a progress of the agent towards completing a task.

As a particular example, the reward can be a sparse binary reward that is zero unless the task is successfully completed and one if the task is successfully completed as a result of the action performed.

As another particular example, the reward can be a dense reward that measures a progress of the agent 112 towards completing the task as of individual observations received during an episode of attempting to perform the task. That is, individual observations can be associated with non-zero reward values that indicate the progress of the robot towards completing the task when the environment is in the state characterized by the observation.

In some cases, the policy output identifies an optimal action from the set of possible action to be performed by the agent 112 in response to the observation. For example, the policy output can identify torques to be applied to one or more joints of the agent 112.

The policy neural network 110 can have any appropriate architecture that allows the policy neural network 110 to process an observation to generate a policy output.

Generally, however, the policy neural network 110 includes an encoder neural network having a plurality of encoder parameters and configured to receive a visual observation characterizing a state of the environment and to process the input to generate an internal representation of the input. The policy neural network 110 also includes a policy output neural network having a plurality of policy output parameters and configured to receive a policy input that includes at least the internal representation and to generate a policy output defining an action to be performed by the agent in response to the visual observation.

As a particular example, when the observations include only the visual observation, the encoder can be a convolutional neural network that generates the internal representation and the policy output neural network can be a deep fully-connected neural network or a deep recurrent neural network that processes the internal representation to generate the output. As another example, when the observations include both high-dimensional visual inputs and lower-dimensional inputs, the encoder can include be convolutional encoder that encodes the high-dimensional. The policy output neural network can then combine, e.g., concatenate or combine through a non-linear transformation, the internal representation of the visual observation with the low-dimensional inputs and generate the policy output from the combined input.

Thus, the system 100 trains the policy neural network 110 to determine trained values of the parameters of the policy neural network (i.e., the encoder parameters and the policy output parameters, jointly referred to as "policy network parameters") so that when the policy neural network 110 is used to control the agent 112, i.e., to select actions to be performed by the agent 112, the agent 112 successfully performs the particular task. The particular task can be, e.g., a task that requires identifying an object in the environment, moving an object to a particular location in the environment, navigating in the environment, or any other task that requires interacting with the requirement to satisfy a specified goal.

The system 100 trains the policy neural network 110 in part by using the policy neural network 110 to control a simulated version of the real-world agent to cause the simulated version of the real-world agent to perform a simulated version of the particular task in a simulated version 120 of the environment. A simulated version of a real-world environment is one or more computer programs that model the dynamics, semantics, and appearance of the real-world environment. This set of computer programs is also referred to as a "simulator" 120 and the information that the simulator uses to generate a frame of the simulator is referred to as the state of the simulator. As a particular example, the state of the simulator can include the positions and orientations of all joints of all objects in the environment at any given time and the linear and angular velocities of all objects in the environment at any given time. Some, but not all, of this state information is generally visible from the observations that are taken as input by the policy neural network 110.

In particular, the system 100 first trains the policy neural network 110 to determine first values of the policy network parameters by optimizing a first task-specific objective that measures a performance of the policy neural network 110 in controlling a simulated version of the real-world agent to cause the simulated version of the real-world agent to perform a simulated version of the particular task in the simulated version 120 of the environment.

The system 100 also obtains real-world data 130 generated from interactions of the real-world agent 112 with the real-world environment 114. The real-world data 130 generally includes multiple sequences of observations received as the agent 112 interacts with the environment 114 and data identifying the actions performed by the agent 112 in response to those observations. For example, the system 100 can control the agent using the policy neural network in accordance with the first values of the policy network parameters and record the sequences of observations and actions that are generated as a result of this control. Advantageously, this data does not need to be labelled with any task-specific rewards or success data.

The system 100 then trains the policy neural network 110 further using the simulator 120 and the real-world data 130 to determine trained values of the policy network parameters from the first values of the policy network parameters.

The operations performed by the system 100 to train the policy neural network 110 will be described further below with reference to FIGS. 2 and 3.

After the system 100 has trained the policy neural network 110, the system 100 can control the robot 112 while the agent 112 performs the particular task using the trained policy neural network 110.

Alternatively or in addition, the system can provide data specifying the trained policy neural network 110, i.e., the trained values of the parameters of the neural network, for use in controlling an agent while the agent performs the particular task.

Figure 2:
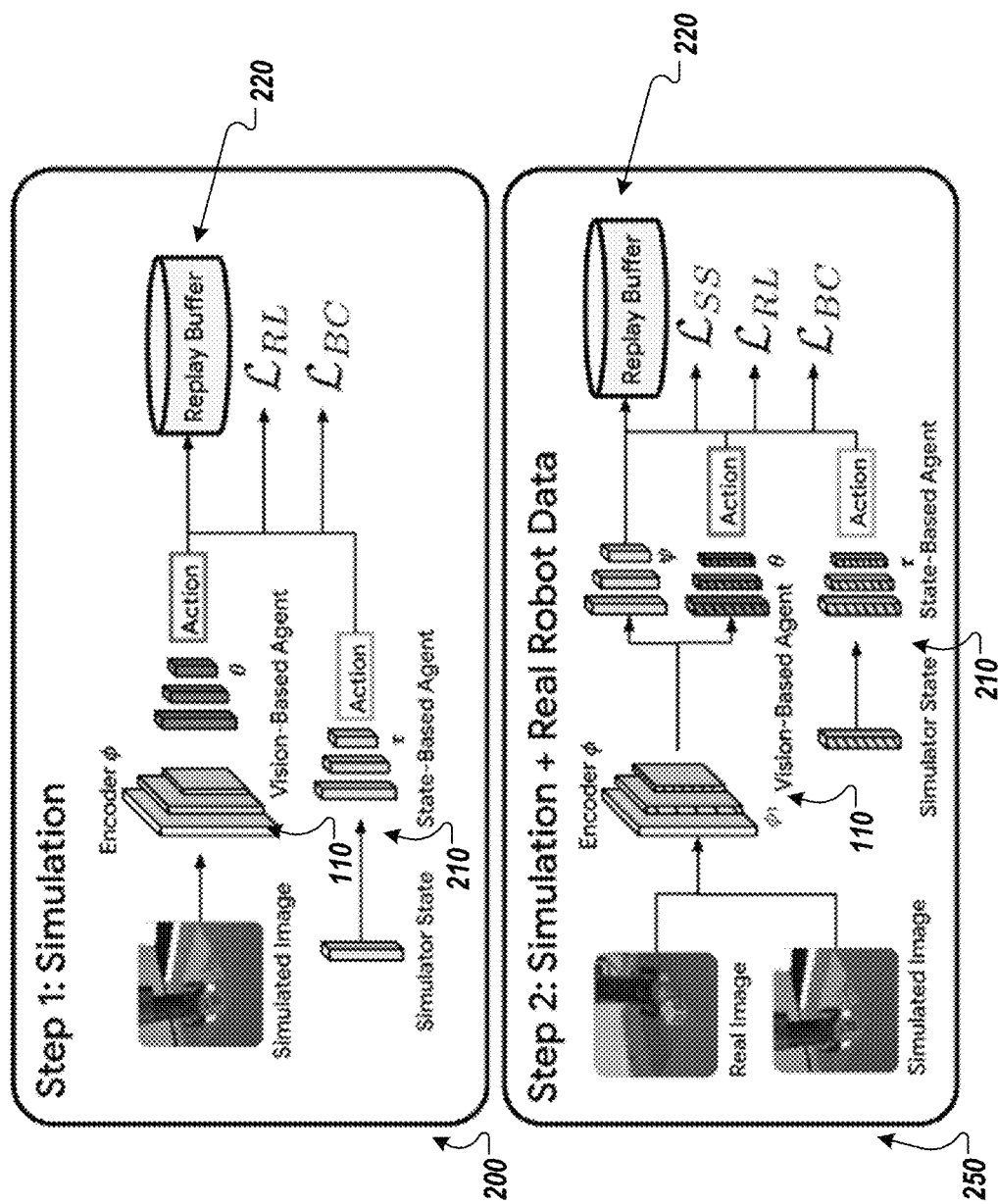
FIG. 2 is a diagram of the steps of the training of the policy neural network.

FIG. 2 is a diagram 200 of the steps of training the policy neural network 110.

Generally, the training includes two steps: step 1 (200), in which the system trains the policy neural network entirely in simulation, and step 2 (250), in which the system trains the policy neural network both in simulation and on the real-world data.

During step 1, the system trains the policy neural network 110 (referred to in the figure as a "vision-based agent" because the neural network operates on visual observations) on a first task-specific objective that measures a performance of the policy neural network in controlling a simulated version of the real-world agent to cause the simulated version of the real-world agent to perform a simulated version of the particular task in a simulated version of the environment. By performing this training, the system determines first values of the policy parameters from initial values of the policy parameters, i.e., adjusts the values of the encoder parameters φ and the policy output parameters θ.

During this step, the system can train the policy neural network on any of a variety of objectives that require controlling the simulated version of the agent and measuring the performance of the simulated version of the agent on the task as a result of the control.

FIG. 2 shows a particular example of such an objective that is a combination, e.g., a sum or a weighted sum, of two-task specific losses: a reinforcement learning loss $L_{RL}$ that optimizes task-specific rewards for the particular task and a behavior cloning loss $L_{BC}$.

To train the policy neural network to minimize the reinforcement learning loss and to maximize a sum or time-discounted sum of task-specific rewards received by the agent while performing the particular task, the system controls the simulated agent using the policy neural network to attempt to perform the task and stores training data identifying observations ("simulated images") received, actions performed, and rewards for the particular task received as a result of the actions performed by the agent in a replay buffer 220. The replay buffer 220 can be any available memory, e.g., one or more physical or logical storage devices, for storing training data.

The system also repeatedly samples training data from the buffer and trains the policy neural network on the sampled training data using an appropriate reinforcement learning technique. Examples of reinforcement learning techniques include Q-learning and actor-critic techniques like deep deterministic policy gradients (DDPG) and Maximum a Posteriori Policy Optimization (MPO).

The behavior cloning loss makes use of a state-based neural network 210 (also referred to as a "state-based agent").

The state-based neural network is a neural network that generates the same type of policy output as the policy neural network but is conditioned on the state of the simulator ("simulator states") that is generating the simulated version of the environment that is being interacted with by the agent. Thus, unlike the policy neural network, which only receives incomplete information about the state through the visual observations, the state-based neural network has access to the complete state of the simulator (and, therefore, to access to complete information about the state of the environment). While this privileged information is not available in the real-world environment, making use of the state-based neural network during training can allow the system to speed up the training of the policy neural network by training the policy neural network to imitate the state-based neural network.

The state-based neural network can have any appropriate neural network architecture. For example, the state-based neural network can be a deep fully-connected neural network.

During step 1, the system can train the state-based neural network on the same reinforcement learning loss, either jointly with the policy neural network or in advance of training the policy neural network.

The system then uses the outputs generated by the state-based neural network (either after the state-based neural network is trained or as the state-based neural network is also being trained) to train the policy neural network to minimize the behavior cloning loss.

The behavior cloning loss measures a difference between outputs generated by the policy neural network and either actions performed by the simulated agent when controlled using the state-based neural network or outputs generated by the state-based neural network. That is, the behavior cloning loss measures a difference in actions or expected actions to be performed by the agent between the policy and state-based neural network given that the simulator is in the same state when the inputs to both networks are generated (as characterized either by a visual observation in the input to the policy neural network or by the actual state of the simulator in the input to the state-based neural network). For example, when the output of the policy neural network directly identifies an action, the loss can be a squared L2 distance loss. As another example, when the output of the policy neural network defines a probability distribution, the loss can be a log likelihood loss relative to the action performed by the simulated agent when controlled using the state-based neural network or can be based on a KL divergence between the policy output and the output of the state-based neural network.

Optionally, the system can also add training data generated by controlling the simulated agent using the state-based neural network to the replay buffer for use in training the policy neural network through reinforcement learning. When adding such data to the buffer, the system replaces the simulator state with a corresponding visual observation that characterizes the same state of the environment. Further optionally, if demonstration data generated as a result of an expert agent successfully performing the task is available to the system, the system can also add the demonstration data to the replay buffer for use in training the policy neural network through reinforcement learning.

During step 2, the system trains the policy neural network by jointly optimizing (i) a self-supervised objective $L_{SS}$ that measures at least a performance of internal representations generated by the policy neural network on a self-supervised task performed on the real-world data and (ii) a second task-specific objective that measures the performance of the policy neural network in controlling the simulated version of the real-world agent to cause the simulated version of the real-world agent to perform the simulated version of the particular task in the simulated version of the environment.

In the example of FIG. 2, the second task-specific objective is the same as the first task-specific objective. In practice, however, the two objective can be the same or can be different. For example, in some cases, the second objective could include either the behavior cloning objective or the reinforcement learning objective (but not both). When the behavior cloning objective is used in step 2, the system can freeze the values of the parameters of the state-based neural network.

The internal representations that are used for the self-supervised objective are generally the outputs of one or more intermediate layers, i.e., layers other than the output layer that generates the policy output, of the policy neural network. In particular, as described above, the internal representations can be the output of the last layer in the encoder neural network that is generated by the encoder neural network by processing the visual observation.

The "self-supervised task" is referred to as "self-supervised" because the supervision for the self-supervised task, i.e., the target output that should be generated for any given intermediate representation, is obtained entirely from the unlabeled real-world data.

In some implementations, during the training performed in step 2, the system holds the values of certain ones of the policy network parameters fixed to the first values while adjusting the values of the remaining policy network parameters. As a particular example, the system can adjust only the parameter values of the first one or more layers of the policy neural network, i.e., the first one or more layers of the encoder neural network, while holding the parameter values of the remainder of the layers of the encoder neural network fixed.

As a specific example, the encoder neural network can include a stack of layers, e.g., a stack of convolutional layers, that process the visual observation to generate the internal representation. During step 2, the system would adjust the values of the parameters of one or more initial layers in the stack while holding values of the parameters of one or more later layers in the stack fixed to the first values.

Generally, the real-world data obtained by the system and used for the self-supervised objective includes multiple sequences of observations ("real-world images") characterizing states of the real-world environment as the real-world agent interacts with the real-world environment. Each sequence can optionally also include actions performed by the agent in response to at least some of the observations in the sequence.

Accordingly, the system uses a sequence-based self-supervised objective as the self-supervised objective. A sequence-based self-supervised objective is one that takes as input information from multiple different time steps within a sequence in order to compute a loss.

As one example, the sequence-based self-supervised objective is a time-contrastive objective. When multiple images of the same scene from different viewpoints or modalities taken at the same time are available, the time-contrastive objective ensures that internal representations of two images (anchor and positive) coming from the same time but different viewpoints (or modalities) are pulled together, while the internal representation of a visually similar image from a temporal neighbor, i.e., from the same sequence and modality or viewpoint as the anchor image but at a different time, is pushed apart from the internal representation of the anchor image. When only a single image at a given time is available, the time-contrastive objective ensures that internal representations of images that are within a small window of the anchor image are closer than internal representations that are at a distance time step within the same sequence. Time-contrastive objectives are described in more detail in Sermanet, et al., Time-Contrastive Networks: Self-Supervised Learning from Video, arXiv: 1704.06888.

As another example, when the sequences in the real-world data also include actions, the sequence-based self-supervised objective can measure the performance on a self-supervised task to predict, for a given observation in the sequence, an internal representation generated by the policy neural network for a future observation that is a specified number of observations after the given observation in the sequence based on (i) the internal representation for the given observation and (ii) the actions performed by the agent in response to the given observation and any observations between the given observation and the future observation in the sequence.

In particular, in this example, the self-supervised objective can measure (i) an error between the predicted internal representation for the future observation and the internal representation generated by the policy neural network for the future observation and (ii) respective errors between the predicted internal representation for the future observation and each of one or more internal representations that were generated by the policy neural network for other observations that are not the future observation.

In particular, the self-supervised objective can be any appropriate contrastive loss that uses the predicted representation as the anchor example, the internal representation generated by the policy neural network for the future observation as the positive example, and the internal representations that were generated by the policy neural network for other observations that are not the future observation as negative example. Such a loss encourages (i) to be smaller than (ii), i.e., encourages the anchor and positive example to be close in the internal representation space while encouraging the anchor and negative examples to be far apart in the internal representation space.

The specified number can be any positive integer. For example, the specified number can be 1 and the system can predict the internal representation at the next time step. As another example, the specified number can be an integer greater than 1 and the system can predict the internal representation at more than one time step into the future.

In order to compute this objective, the system requires a technique for generating the predicted internal representation from the internal representation and the action. To do this, the system can make use of a forward dynamics model ψ.

The forward dynamics model receives as input (i) the internal representation for the given observation and (ii) the actions performed by the agent in response to the given observation and any observations between the given observation and the future observation in the sequence and generates as output the predicted internal representation of the future observation. Thus, when the specified number is one, the dynamics model receives as input the internal representation and the action performed by the agent in response to the given observation.

When the specified number is greater than one, the dynamics model receives as input the internal representation, the action performed by the agent in response to the given observation, and one or more additional actions performed by the agent at time steps between the given time step and the time step of the predicted internal representation. The dynamics model then sequentially generates predicted latent representations by, at each time step, receiving as input (i) the most recently generated predicted internal representation, i.e., the prediction of the latent representation for the corresponding time step and (ii) the action performed by the agent at the corresponding time step to generate the predicted latent representation for the next time step. Once the specified number of predictions have been generated, the system uses the last predicted latent representation as the prediction of the latent representation that would be generated by the policy neural network for the future observation that is the specified number of observations after the given observation in the sequence.

Because the forward dynamics model operates in the space of internal representations that are generally lower-dimensional than the input observations, the forward dynamics model can have a relatively simple and computationally-efficient architecture. For example, the forward dynamics model can be a multi-layer perceptron (MLP)

When the forward dynamics model is used, in step, the system trains the policy neural network on the self-supervised objective by training the forward dynamics model on the self-supervised objective and backpropagating errors from the forward dynamics model into the policy neural network. That is, the system trains the policy neural network and the forward dynamics jointly and updates the policy neural network parameters by backpropagating errors from the forward dynamics model in the policy neural network.

Because the system continues training the policy neural network on the task-specific objective on the simulation data while also training the network on the self-supervised objective on the real data, the system can cause the policy neural network to effectively adapt to the real-world environment without requiring any reward data for the real-world environment.

In particular, by freezing some of the values of the policy neural network while training during step 2, the system causes the policy neural network to adapt its visual perception to the real world without making major changes in the policy logic, which are generally encoded in the higher layers of the neural network that are frozen during step 2. By continuing to optimize the task-specific objective, the system ensures that as the values of the policy parameters that are not frozen are adapted to solve the self-supervised objective, the policy neural network still maintains good performance for the particular task. In other words, the policy neural network adapts to the real-world without compromising the performance of the vision-based agent.

Figure 3:
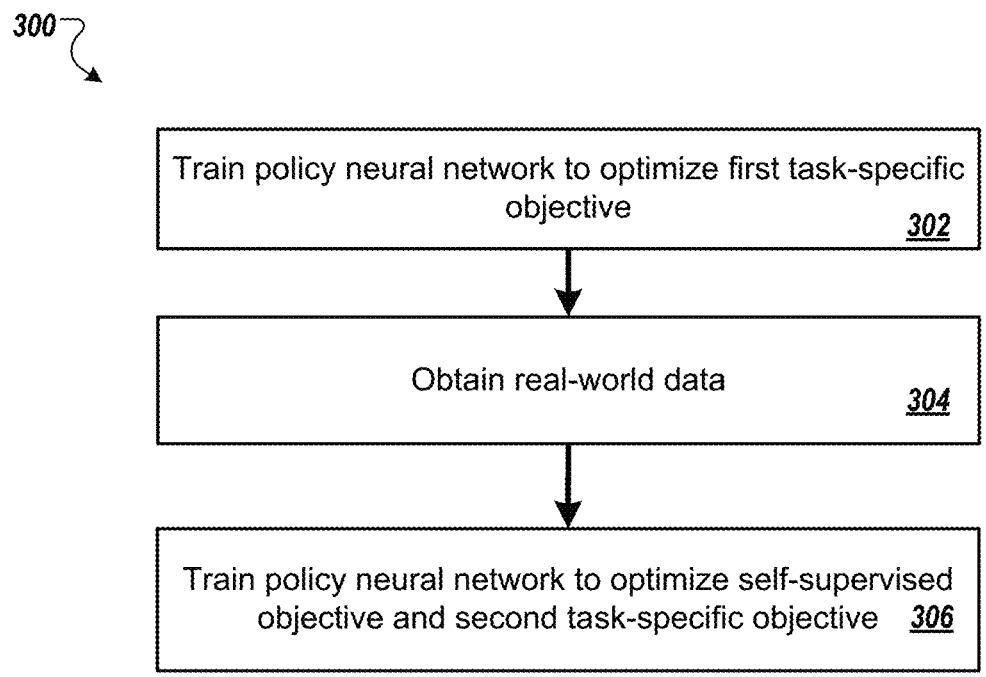
FIG. 3 is a flow diagram of an example process for training a policy neural network.

FIG. 3 is a flow diagram of an example process 300 for training a policy neural network. For convenience, the process 300 will be described as being performed by a system of one or more computers located in one or more locations. For example, a neural network training system, e.g., the neural network training system 100 of FIG. 1, appropriately programmed, can perform the process 300.

The system trains the policy neural network to determine first values of the policy network parameters by optimizing a first task-specific objective (step 302). The first task-specific objective measures a performance of the policy neural network in controlling a simulated version of the real-world agent to cause the simulated version of the real-world agent to perform a simulated version of the particular task in a simulated version of the environment.

The system obtains real-world data generated from interactions of the real-world agent with the real-world environment (step 304).

The system trains the policy neural network to determine trained values of the policy network parameters from the first values of the policy network parameters by jointly optimizing (i) a self-supervised objective that measures at least a performance of internal representations generated by the policy neural network on a self-supervised task performed on the real-world data and (ii) a second task-specific objective that measures the performance of the policy neural network in controlling the simulated version of the real-world agent to cause the simulated version of the real-world agent to perform the simulated version of the particular task in the simulated version of the environment (step 306).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a policy neural network having a plurality of policy network parameters to control a real-world agent interacting with a real-world environment to cause the real-world agent to perform a particular task, the method comprising:
    training the policy neural network to determine first values of the policy network parameters by optimizing a first task-specific objective that measures a performance of the policy neural network in controlling a simulated version of the real-world agent to cause the simulated version of the real-world agent to perform a simulated version of the particular task in a simulated version of the environment;
    obtaining real-world data generated from interactions of the real-world agent with the real-world environment, wherein the real-world data comprises a sequence of observations at multiple different time steps characterizing states of the real-world environment as the real-world agent interacts with the real-world environment; and
    training the policy neural network to determine trained values of the policy network parameters from the first values of the policy network parameters by optimizing (i) a self-supervised objective that measures at least a performance of internal representations generated by one or more hidden layers of the policy neural network on a self-supervised task performed on the real-world data and (ii) a second task-specific objective that measures the performance of the policy neural network in controlling the simulated version of the real-world agent to cause the simulated version of the real-world agent to perform the simulated version of the particular task in the simulated version of the environment;
    wherein training the policy neural network to optimize the self-supervised objective comprises, for a first observation at a first time step and a second, different observation at a second time step that is after the first time step in the sequence of observations included in the real-world data:
        processing, by a forward dynamics model, a model input including data defining:
        (i) a first internal representation generated by one or more hidden layers of the policy neural network by processing the first observation, and (ii) actions performed by the agent at the first time step and at any intermediate time steps between the first time step and the second time step, to generate a model output that defines an estimate of a second internal representation generated by one or more hidden layers of the policy neural network by processing the second observation; and
        backpropagating gradients of the self-supervised objective through the forward dynamics model and into the policy neural network, wherein the self-supervised objective measures an error in the estimate generated by the forward dynamics model of the second internal representation.

2. The method of claim 1, wherein the first task-specific objective and the second task-specific objective are the same.

3. The method of claim 1, wherein the policy neural network comprises:
    an encoder neural network having a plurality of encoder parameters and configured to receive a visual observation characterizing a state of the environment and to process the visual observation to generate an internal representation; and
    a policy output neural network having a plurality of policy output parameters and configured to receive a policy input comprising at least the internal representation and to generate a policy output defining an action to be performed by the agent in response to the visual observation.

4. The method of claim 3, wherein the policy input further comprises a proprioceptive observation characterizing the state of the environment.

5. The method of claim 3, wherein training the policy neural network to determine trained values of the policy network parameters from the first values of the policy network parameters comprises:
    holding values of the policy output parameters fixed to the first values while adjusting values of at least some of the encoder parameters.

6. The method of claim 5, wherein the encoder neural network comprises a plurality of layers arranged in a stack one after the other, and wherein training the policy neural network to determine trained values of the policy network parameters from the first values of the policy network parameters comprises:

adjusting values of the parameters of one or more initial layers in the stack while holding values of the parameters of one or more later layers in the stack fixed to the first values.

7. The method of claim 1, wherein the self-supervised objective also measures the performance of internal representations generated by one or more hidden layers of the policy neural network on the self-supervised task when performed on simulated data generated from interactions of the simulated agent with the simulated environment.

8. The method of claim 1, wherein the self-supervised objective is a time-contrastive objective.

9. The method of claim 1, wherein the self-supervised objective is a contrastive forward dynamics objective that measures (i) an error between the estimate of the second internal representation, and (ii) respective errors between the estimate of the second internal representation and each of one or more internal representations generated by the one or more hidden layers of the policy neural network by processing other observations that are not the second observation.

10. The method of claim 1, wherein the first time step and the second time step are separated by one intermediate time step.

11. The method of claim 1, wherein the first time step and the second time step are separated by greater than one intermediate time steps.

12. The method of claim 1, wherein the first task-specific objective comprises a behavior cloning objective that measures a difference between outputs generated by the policy neural network and actions performed by the simulated agent when controlled using a state-based neural network that controls the agent conditioned on a state of a simulator that is generating the simulated version of the environment.

13. The method of claim 12, wherein the state-based neural network is trained through reinforcement learning to optimize task-specific rewards for the particular task.

14. The method of claim 1, wherein the first task-specific objective comprises a reinforcement learning objective that optimizes task-specific rewards for the particular task.

15. The method of claim 1, wherein the second task-specific objective comprises a behavior cloning objective that measures a difference between outputs generated by the policy neural network and actions performed by the simulated agent when controlled using a state-based neural network that controls the agent conditioned on a state of a simulator that is generating the simulated version of the environment.

16. The method of claim 15, wherein the state-based neural network is trained through reinforcement learning to optimize task-specific rewards for the particular task.

17. The method of claim 1, wherein the second task-specific objective comprises a reinforcement learning objective that optimizes task-specific rewards for the particular task.

18. The method of claim 1, wherein the real-world data is generated from interactions of the real-world agent with the real-world environment while controlled by the policy neural network in accordance with the first values of the policy network parameters.

19. A system comprising one or more computers and one or more storage devices storing instructions that when executed by the one or more computers cause the one or more computers to perform operations for training a policy neural network having a plurality of policy network parameters to control a real-world agent interacting with a real-world environment to cause the real-world agent to perform a particular task, the operations comprising:

training the policy neural network to determine first values of the policy network parameters by optimizing a first task-specific objective that measures a performance of the policy neural network in controlling a simulated version of the real-world agent to cause the simulated version of the real-world agent to perform a simulated version of the particular task in a simulated version of the environment;

obtaining real-world data generated from interactions of the real-world agent with the real-world environment, wherein the real-world data comprises a sequence of observations at multiple different time steps characterizing states of the real-world environment as the real-world agent interacts with the real-world environment; and training the policy neural network to determine trained values of the policy network parameters from the first values of the policy network parameters by optimizing (i) a self- supervised objective that measures at least a performance of internal representations generated by one or more hidden layers of the policy neural network on a self-supervised task performed on the real-world data and (ii) a second task-specific objective that measures the performance of the policy neural network in controlling the simulated version of the real-world agent to cause the simulated version of the real-world agent to perform the simulated version of the particular task in the simulated version of the environment;

wherein training the policy neural network to optimize the self-supervised objective comprises, for a first observation at a first time step and a second, different observation at a second time step that is after the first time step in the sequence of observations included in the real-world data:

processing, by a forward dynamics model, a model input including data defining:

(i) a first internal representation generated by one or more hidden layers of the policy neural network by processing the first observation, and (ii) actions performed by the agent at the first time step and at any intermediate time steps between the first time step and the second time step, to generate a model output that defines an estimate of a second internal representation generated by one or more hidden layers of the policy neural network by processing the second observation; and backpropagating gradients of the self-supervised objective through the forward dynamics model and into the policy neural network, wherein the self-supervised objective measures an error in the estimate generated by the forward dynamics model of the second internal representation.

20. One or more non-transitory computer-readable storage media storing instructions that when executed by one or more computers cause the one or more computers to perform operations for training a policy neural network having a plurality of policy network parameters to control a real-world agent interacting with a real-world environment to cause the real-world agent to perform a particular task, the operations comprising:

training the policy neural network to determine first values of the policy network parameters by optimizing a first task-specific objective that measures a performance of the policy neural network in controlling a simulated version of the real-world agent to cause the simulated version of the real-world agent to perform a simulated version of the particular task in a simulated version of the environment;

obtaining real-world data generated from interactions of the real-world agent with the real-world environment, wherein the real-world data comprises a sequence of observations at multiple different time steps characterizing states of the real-world environment as the real-world agent interacts with the real-world environment; and training the policy neural network to determine trained values of the policy network parameters from the first values of the policy network parameters by optimizing (i) a self-supervised objective that measures at least a performance of internal representations generated by one or more hidden layers of the policy neural network on a self-supervised task performed on the real-world data and (ii) a second task-specific objective that measures the performance of the policy neural network in controlling the simulated version of the real-world agent to cause the simulated version of the real-world agent to perform the simulated version of the particular task in the simulated version of the environment;

wherein training the policy neural network to optimize the self-supervised objective task comprises, for a first observation at a first time step and a second, different observation at a second time step that is after the first time step in the sequence of observations included in the real-world data:

processing, by a forward dynamics model, a model input including data defining: (i) a first internal representation generated by one or more hidden layers of the policy neural network by processing the first observation, and (ii) actions performed by the agent at the first time step and at any intermediate time steps between the first time step and the second time step, to generate a model output that defines an estimate of a second internal representation generated by one or more hidden layers of the policy neural network by processing the second observation; and backpropagating gradients of the self-supervised objective through the forward dynamics model and into the policy neural network, wherein the self-supervised objective measures an error in the estimate generated by the forward dynamics model of the second internal representation.

21. The one or more non-transitory computer storage media of claim 20, wherein the first task-specific objective and the second task-specific objective are the same.

\* \* \* \* \*